US008396616B1

(12) United States Patent
Barber et al.

(10) Patent No.: US 8,396,616 B1
(45) Date of Patent: Mar. 12, 2013

(54) SYSTEM, MODULE, AND METHOD FOR PRESENTING SURFACE SYMBOLOGY ON AN AIRCRAFT DISPLAY UNIT

(75) Inventors: Sarah Barber, Cedar Rapids, IA (US); Alena L. Benson, Seattle, WA (US); Felix B. Turcios, Cedar Rapids, IA (US); Kirschen A. Seah, Cedar Rapids, IA (US); Steve L. Oehlert, Cedar Rapids, IA (US); Matthew J. Carrico, Mt. Vernon, IA (US); Hung-i B. Tsai, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 378 days.

(21) Appl. No.: 12/822,660

(22) Filed: Jun. 24, 2010

(51) Int. Cl.
*G06F 7/70* (2006.01)

(52) U.S. Cl. ........................................................ 701/14

(58) Field of Classification Search ..................... 701/14
See application file for complete search history.

(56) References Cited

U.S. PATENT DOCUMENTS

| | | | | |
|---|---|---|---|---|
| 7,755,516 B2* | 7/2010 | Clark et al. | ................... | 340/961 |
| 2010/0030467 A1* | 2/2010 | Wise et al. | .................... | 701/204 |
| 2010/0321488 A1* | 12/2010 | Soler | ............................ | 348/115 |
| 2011/0098871 A1* | 4/2011 | Buchanan et al. | .............. | 701/14 |

OTHER PUBLICATIONS

"Human Factors Considerations in the Design and Evaluation of Moving Map Displays of Ownship on the Airport Surface"; Sep. 2004; Table of Contents; Appendix A: Industry Overview; Federal Administration; Washington, D.C.

* cited by examiner

*Primary Examiner* — James Trammell
*Assistant Examiner* — Michael D Lang
(74) *Attorney, Agent, or Firm* — Donna P. Suchy; Daniel M. Barbieri

(57) ABSTRACT

A present novel and non-trivial system, module, and method for presenting surface symbology on an aircraft display unit are disclosed. Symbology image data representative of an image depicting a runway highlighter adjacent to the assigned runway is generated by a symbology generator based upon assigned runway information and airport surface information provided by a flight management data source and the navigation reference data source, respectively. Such runway highlighter comprises a plurality of runway edge highlighters and a plurality of chevrons pointing in the direction of the assigned runway. The image could include one or more directional runway identifiers. Additionally, the generated image could include the depiction of township location, a line-up distance docking indicator, and/or a groundspeed indicator based upon information provided by a navigation data source. Additionally, the generated image could include the depiction of a wind barb based upon information provided by a weather data source.

26 Claims, 7 Drawing Sheets

100

110 Navigation System
112 Location
114 Attitude
116 Speed
118 Direction

120
Flight Management
System

150
Symbology
Generator

130 Navigation Reference
Data Source
132 Flt Nav DB
134 Taxi Nav DB
136 Other Aircraft
Systems 140 Weather Data Source
142 Datalink
System
144 Manual Input
Device 160 Display
Unit

SYSTEM, MODULE, AND METHOD FOR PRESENTING SURFACE SYMBOLOGY ON AN AIRCRAFT DISPLAY UNIT

BACKGROUND OF THE INVENTION

1. Field of the Invention

This invention pertains generally to the field of aircraft display units that provide information to the pilot or flight crew of an aircraft.

2. Description of the Related Art

Runway incursions are the most noticeable form of taxi navigation error. Increased scrutiny by regulatory authorities has heightened the awareness of the safety issues related to runway incursions. Taxi navigation errors cause many runway incursions and present potential collision hazards.

Systems used for presenting runway incursion and/or basic surface traffic information to a pilot for avoiding runway incursions may be comprised of two basic components. One component could comprise the display of airport, airport surfaces, and/or and other information on a visual display unit, wherein such display could show ground and/or air traffic. Another component could comprise advisories such as caution and/or warning alerts that could be generated by a processor employing one or more runway incursion-related algorithms to known traffic information.

Systems that display airport, airport surfaces, and/or and other symbolic information on an aircraft display unit can provide the pilot with too much information or information that is rich in detail. In such case, the pilot could lose his or her situational awareness because specific symbols of interest or importance are not highlighted or made conspicuous when displayed with other symbologies.

BRIEF SUMMARY OF THE INVENTION

The embodiments disclosed herein present at least one novel and non-trivial system, module, and method for presenting surface symbology on an aircraft display unit. The use of symbology may be used to enhance a pilot's situational awareness of the airport surface environment.

In one embodiment, a system is disclosed for presenting surface symbology on an aircraft display unit. The system could comprise a flight management data source for providing assigned runway information, a navigation reference data source for providing airport surface information, a symbology generator, and a display unit. The symbology generator could generate symbology image data based upon the flight management data and the navigation reference data, and then provide such symbology image data to a display unit for displaying such image. Such symbology image data could represent an image depicting a runway highlighter adjacent to the assigned runway, and the runway highlighter comprises a plurality of runway edge highlighters and a plurality of chevrons pointing in the direction of the assigned runway. In an additional embodiment, the image could include one or more directional runway identifiers. In an additional embodiment, navigation data could be provided to the symbology generator, whereby the generated image could include the depiction of ownship location, a line-up distance docking indicator, and/or a groundspeed indicator. In an additional embodiment, weather data could be provided to the symbology generator, whereby the generated image could include the depiction of a wind barb.

In another embodiment, a module is disclosed for presenting surface symbology on an aircraft display unit. The module could comprise input and output interfaces and a symbology generator, where each interface facilitates the transfer of data to and from the symbology generator. After receiving flight management data representative of assigned runway information and navigation reference data representative of airport surface information from applicable source(s) via the input interface, the symbology generator could generate symbology image data representative of an image depicting a runway highlighter adjacent to the assigned runway, and then provide such symbology image data to a display unit for displaying such image. Such runway highlighter could comprise a plurality of runway edge highlighters and a plurality of chevrons pointing in the direction of the assigned runway. In an additional embodiment, the image could include one or more directional runway identifiers. In an additional embodiment, the symbology generator could receive navigation data, whereby the generated image could include the depiction of ownship location, a line-up distance docking indicator, and/or a groundspeed indicator based upon the navigation data. In an additional embodiment, the symbology generator could receive weather data, whereby the generated image could include the depiction of a wind barb based upon the weather data.

In another embodiment, a method is disclosed for presenting surface symbology on an aircraft display unit. Flight management data representative of assigned runway information and navigation reference data representative of airport surface information could be received. Symbology image data representative of an image depicting a runway highlighter adjacent to the assigned runway could be generated, and the symbology image data could be provided to a display unit for displaying the image. Such runway highlighter could comprise a plurality of runway edge highlighters and a plurality of chevrons pointing in the direction of the assigned runway. In an additional embodiment, the image could include one or more directional runway identifiers. In an additional embodiment, navigation data could be received, whereby the generated image could include the depiction of ownship location, a line-up distance docking indicator, and/or a groundspeed indicator based upon the navigation data. In an additional embodiment, weather data could be received, whereby the generated image could include the depiction of a wind barb based upon the weather data.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
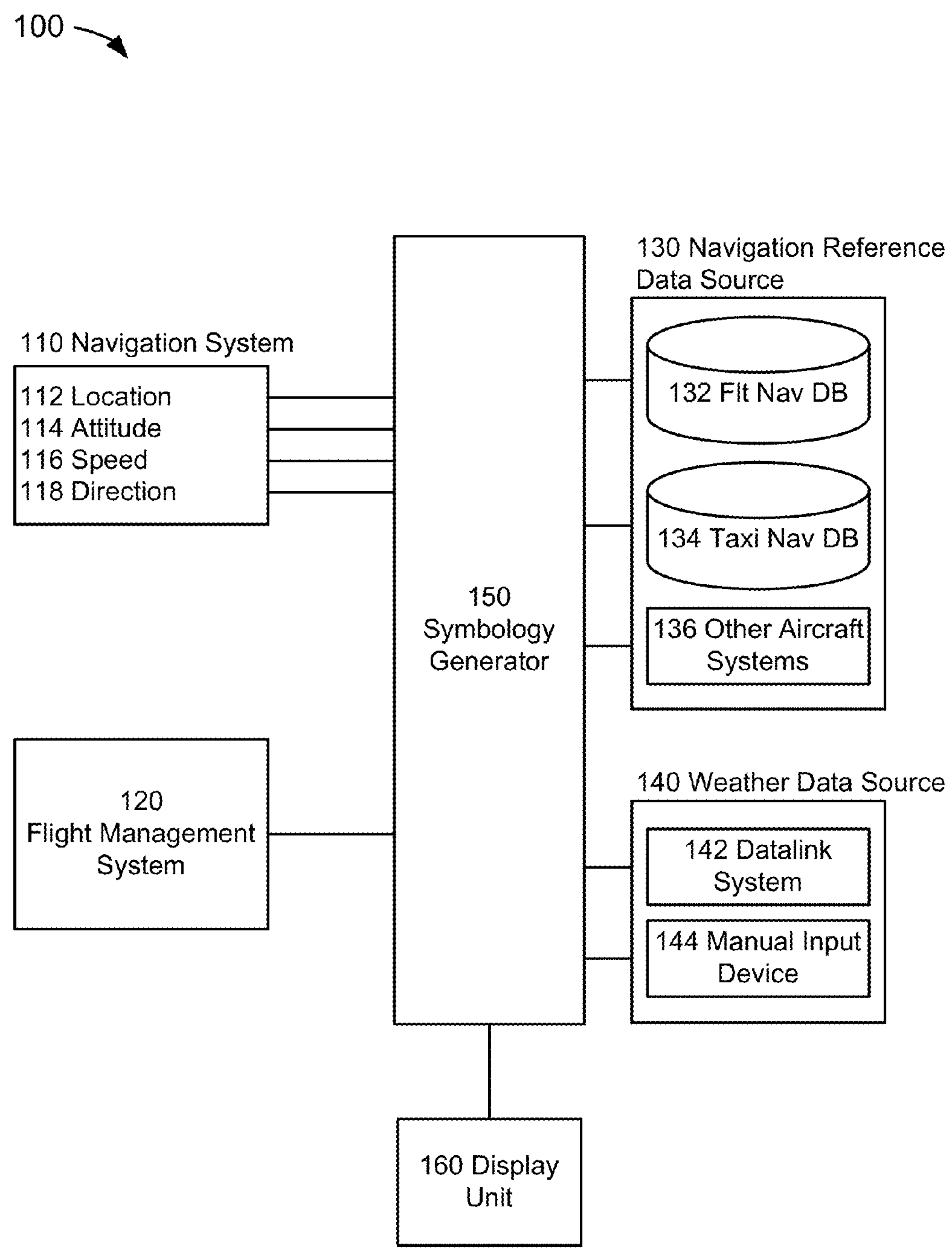
FIG. 1 depicts a block diagram of an airport surface symbology presentation system.

FIG. 1 depicts a block diagram of a surface symbology presentation system 100 suitable for it implementation of the techniques described herein. The surface symbology presentation system 100 of an embodiment of FIG. 1 includes navigation data system 110, a flight management system ("FMS") 120, a navigation reference data source 130, a weather data source 140, a symbology generator ("SG") 150, and a display unit 160.

In an embodiment of FIG. 1, the navigation system 110 comprises the system or systems that could provide navigation data information in an aircraft. It should be noted that data, as embodied herein for any source or system in an aircraft, could be comprised of any analog or digital signal, either discrete or continuous, which could contain information. As embodied herein, aircraft could mean any vehicle which is able to fly through the air or atmosphere including, but not limited to, lighter than air vehicles and heavier than air vehicles, wherein the latter may include fixed-wing and rotary-wing vehicles.

The navigation system 110 may include, but is not limited to, an air/data system, an attitude heading reference system, an inertial guidance system (or inertial reference system), a radio navigation system, and a global navigation satellite system (or satellite navigation system), all of which are known to those skilled in the art. As embodied herein, the navigation system 110 could provide navigation data including, but not limited to, aircraft location (or geographic location) 112, attitude 114, speed 116, and direction 118. As embodied herein, aircraft location 112 could include altitude information, and direction 118 may be derived from location information. As embodied herein, navigation data may be provided to the SG 150 for subsequent processing as discussed herein.

In an embodiment of FIG. 1, the FMS 120 may perform a variety of functions performed to help the crew in the management of the flight; these functions are known to those skilled in the art. These functions could include receiving assigned runway information and providing such information to the SG 150 as discussed below. Additionally, the FMS 120 could compute a variety of distances and/or surface lengths such as, but not limited to, a minimum take-off field length, runway useable distance, a runway available distance, and/or a line up distance of the assigned runway based upon one or more data provided to the FMS 120 automatically and/or through pilot input. Alternatively, such distances and/or lengths could be computed by the pilot and entered into the FMS 120. As embodied herein, data representative of flight management information may be provided by the FMS 120 to the SG 150 for subsequent processing as discussed herein.

The FMS 120 may also be a source of navigation reference data. In an embodiment of FIG. 1, the navigation reference data source 130 could comprise any source of airport surface data including, but is not limited to, a flight navigation database 132, a taxi navigation database 134, and/or other aircraft systems 136.

The flight navigation database 132 may contain records which provide runway data. The flight navigation database 132 could contain navigation reference data representative of formation associated with, but not limited to, airport and airport surfaces including runways and taxiways. As embodied herein, the FMS 120 could employ the flight navigation database 132.

The taxi navigation database 134, such as one described by Krenz et al in U.S. Pat. No. 7,974,773, may be used to store airport data that may be comprised, in part, of airport surfaces and airport visual aids. Airport surfaces include, but are not limited to, locations and information delineating or defining locations of runways, taxiways, and apron areas, fixed based operators ("FBOs"), terminals, and other airport facilities. Airport visual aids include, but are not limited to, airport pavement markings, runway markings, taxiway markings, holding position markings, airport signs, mandatory instruction signs, location signs, direction signs, destination signs, information signs, and runway distance remaining signs.

The taxi navigation database 134 could comprise an aerodrome mapping database ("AMDB") as described in the following document published by RTCA, Incorporated: RTCA DO-272A entitled "User Requirements for Aerodrome Mapping Information." RTCA DO-272A provides for aerodrome surface mapping requirements for aeronautical uses particularly on-board aircraft. It should be noted that any standards are subject to change. Those skilled in the art appreciate that standards in the aviation industry including, but not limited to, RTCA DO-272A may be subject to change with future amendments or revisions and/or that other standards related to the subject matter may be adopted. The embodiments disclosed herein are flexible enough to include such future changes and/or adoptions of aviation standards.

Other aircraft systems 136 could comprise the navigation reference data source 130 for providing airport surface data. In one example, a runway awareness and warning system ("RAWS") could provide airport surface data. In another embodiment, an Automatic Dependent Surveillance-Broadcast ("ADS-B") system and/or a Traffic Information Service ("TIS-B") could provide airport surface data. As embodied herein, the navigation reference data source 130 could provide runway data to the SG 150 for subsequent processing as discussed herein.

In an embodiment of FIG. 1, the weather data source 140 could comprise any source of weather data including, but not limited to, a datalink system 142 and/or manual input device 144. A datalink system 142 includes those systems that receive data from sources external to the aircraft including, but not limited to, ground stations and satellites. In an embodiment of FIG. 1, data representative of weather information could be transmitted to the pilot or flight crew of an aircraft via a datalink system 142 which could provide weather information data including data representative of visibility information to an SG 150 for subsequent processing as discussed herein. Weather data transmitted through a datalink system could originate from or be provided by a plurality of weather data sources including, but not limited to, XM Satellite Radio, Inc. and Universal Weather and Aviation, Inc. Weather data that may be broadcast could include data contained in a variety of weather products such as, but not limited to, Aviation Routine Weather Report ("METAR"), Significant Meteorological Information ("SIGMET"), Airmen's Meteorological Information ("AIRMET"), Next-Generation Radar ("NEXRAD"), surface analysis weather maps, surface pressure, surface wind speed and direction, winds aloft, wind shear detection, echo tops, and freezing levels.

The manual input device 144 could allow the pilot or flight crew to enter data manually instead of automatically. Such devices could include, but are not limited to, a tactile device such as a keyboard and/or speech recognition systems. The use of a manual input device 144 could enable the pilot or flight crew to input weather data including reported visibility data manually via such device after listening to a weather report broadcast over a communications radio.

In an embodiment of FIG. 1 the SG 150 may be any electronic data processing unit which executes software or source code stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. The SG 150 may be driven by the execution of software or source code containing algorithms developed for the specific functions embodied herein. Common examples of electronic data processing units are microprocessors, Digital Signal Processors (DSPs), Programmable Logic Devices (PLDs), Programmable Gate Arrays (PGAs), and signal generators; however, for the embodiments herein, the term processor is not limited to such processing units and its meaning is not intended to be construed narrowly. For instance, a processor could also consist of more than one electronic data processing units. As embodied herein, the SG 150 could be a processor(s) used by or in conjunction with any other system of the aircraft including, but not limited to, a processor(s) associated with the navigation system 110, the FMS 120, and a display unit 160 which could include a vision system such as, but not limited to, a synthetic vision system ("SVS"), an enhanced vision system ("EVS"), a combined SVS-EVS, or any combination thereof; for example, although depicted separately in FIG. 1 the SG 150 could be included or made part of the display unit 160.

The SG 150 may be programmed or configured to receive as input data representative of information obtained from various systems and/or sources including, but not limited to, the navigation system 110, the FMS 120, the navigation reference data source 130, and/or the weather data source 140. As embodied herein, the terms "programmed" and "configured" are synonymous. The SG 150 may be electronically coupled to systems and/or sources to facilitate the receipt of input data. As embodied herein, operatively coupled may be considered as interchangeable with electronically coupled. It is not necessary that a direct connection be made; instead, such receipt of input data and the providing of output data could be provided through a data bus or through a wireless network. The SG 150 may be programmed or configured to execute the method discussed in detail below. The SG 150 may be programmed or configured to provide output data to various systems and/or units including, but not limited to, the display unit 160. The SG 150 may be electronically coupled to the display unit 160 to facilitate the providing of output data.

In an embodiment of FIG. 1, the display unit 160 could comprise any unit which presents symbolic information related to airport surfaces. In one embodiment herein, the display unit 160 could be configured to display an airport surface moving map ("ASMM"). The ASMM may depict ownship position on an airport surface, where ownship may be considered the aircraft in which the display unit is installed. Ownship position may be determined from location data provided by the navigation system 110, and airport surfaces may be determined from data provided by the navigation reference data source 130 using the position data. The amount of airport surface information displayed could depend upon a range selected by the pilot, where such range could depend on the amount of information with which he or she wants to be presented. As embodied herein, the ASMM may be used in conjunction with one or more aircraft systems such as an ADS-B system and a TIS-B system to enhance the situational awareness of other traffic on the ground by presenting the position of other traffic on the ASMM in relation to ownship. As embodied herein, the display unit 160 could comprise a portable device, including but not limited to, a handheld device configured for receiving data from one or more sources of data discussed above.

Figure 2:
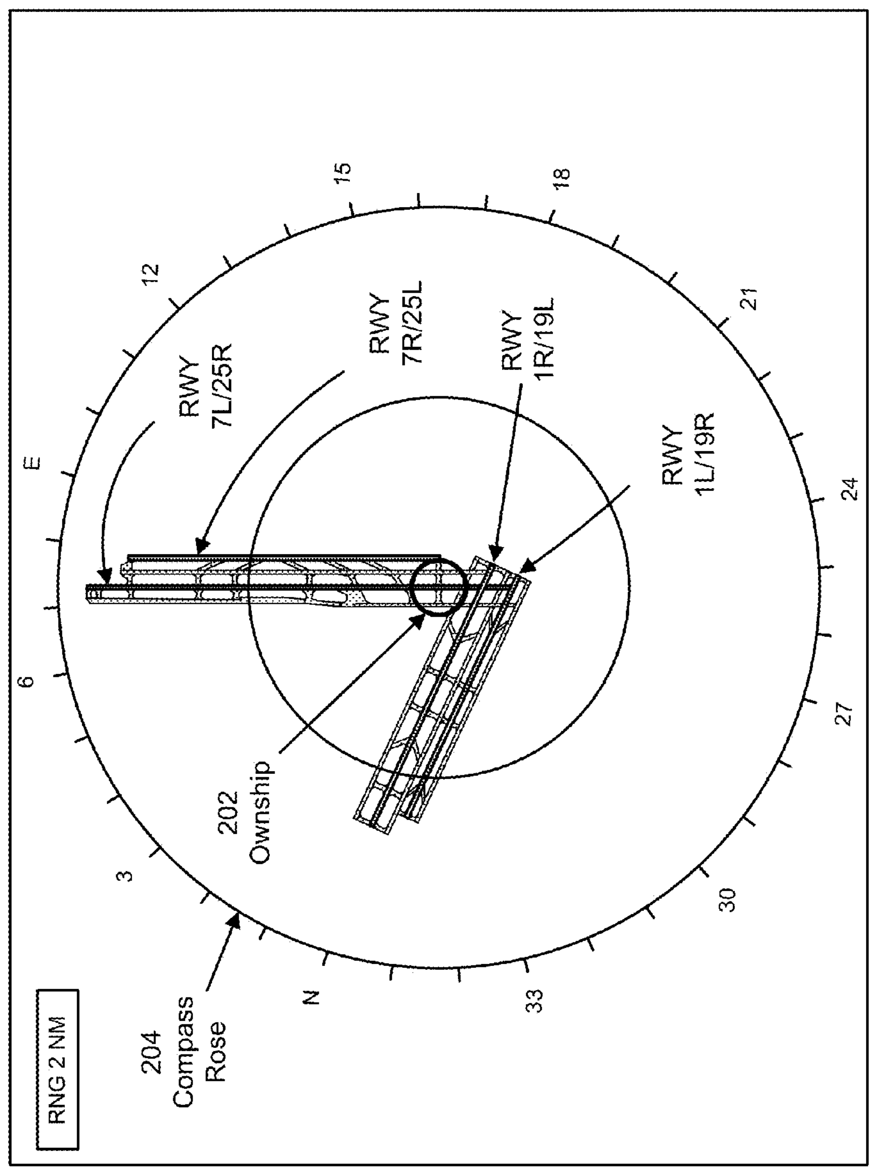
FIG. 2 depicts an exemplary illustration of an Airport Surface Moving Map ("ASMM") without the embodied airport surface symbology.
Figure 3A:
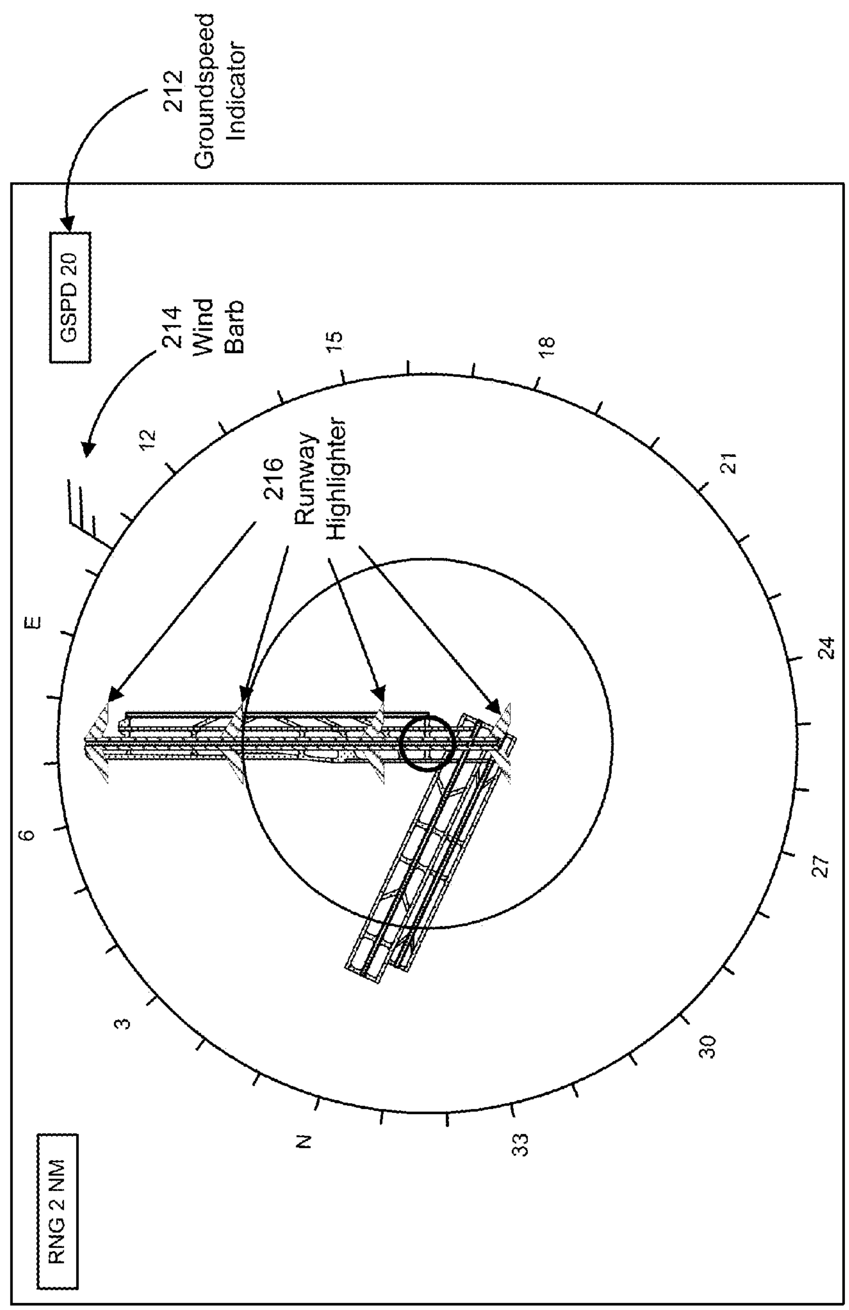
FIG. 3A depicts an exemplary illustration of airport surface symbology depicted on an ASMM having a selected display range of 2 nautical miles ("NM").
Figure 3B:
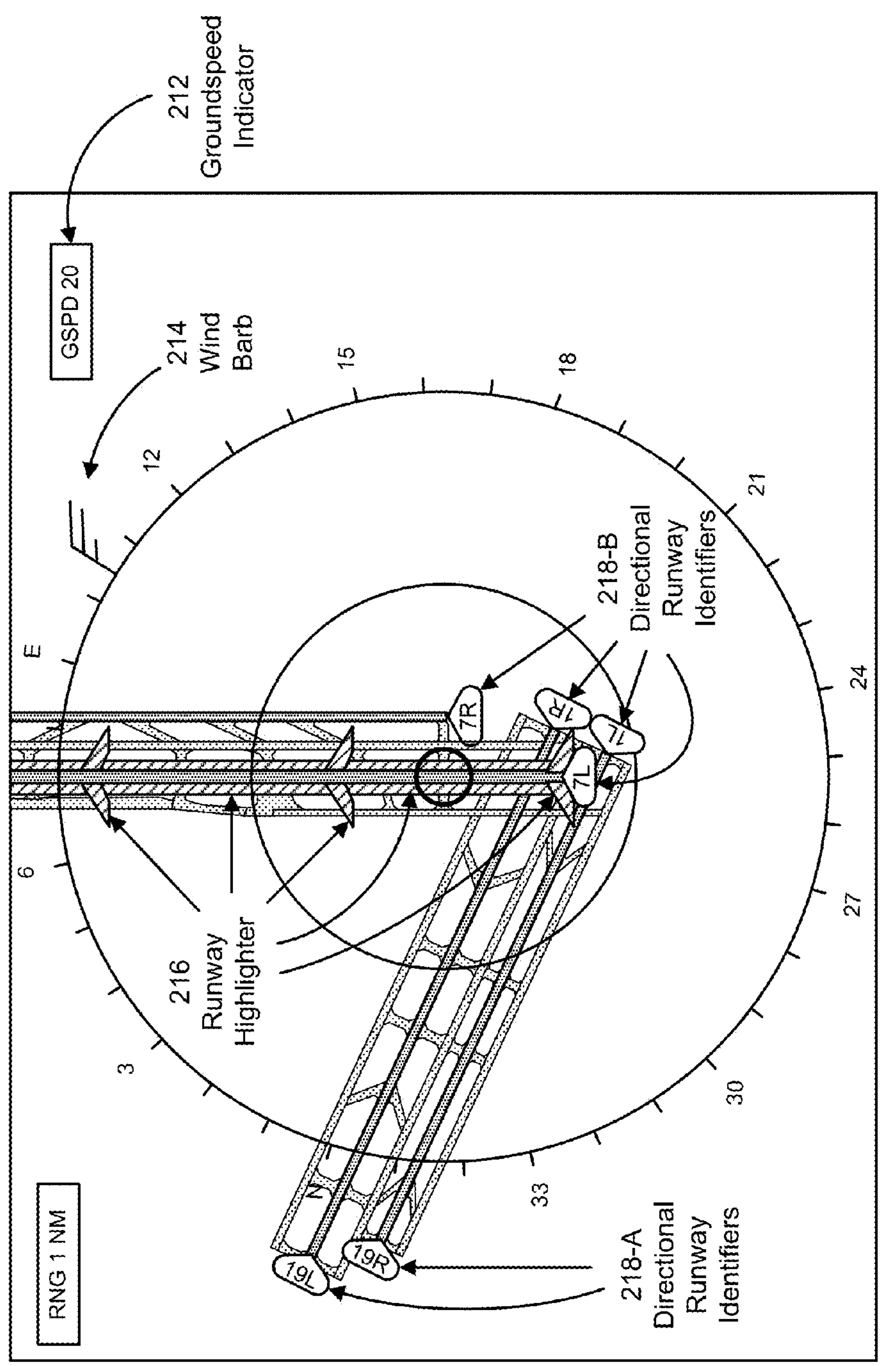
FIG. 3B depicts an exemplary illustration of airport surface symbology depicted on an ASMM having a selected display range of 1 NM.
Figure 3C:
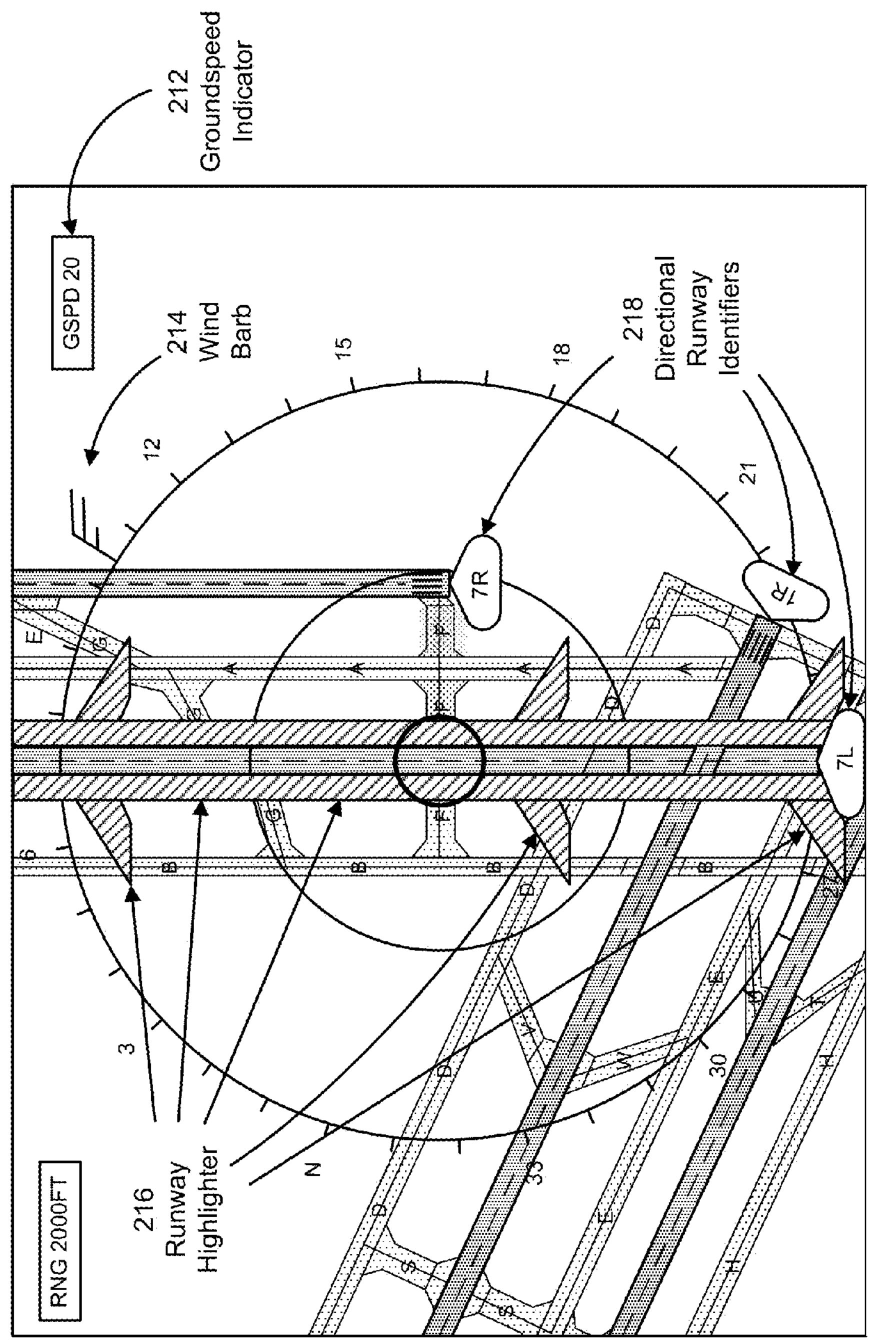
FIG. 3C depicts an exemplary illustration of airport surface symbology depicted on an ASMM having a selected display range of 2000 feet.

FIG. 2 depicts an ASMM for providing an exemplary illustration of ownship and airport surfaces that may be depicted on the display unit 160. FIG. 2 depicts the position of ownship 202 in relation to taxiways and runways, where the runways have been identified as the following: RWY 7L/25R, RWY 7R/25L, RWY 1R/19L, and RWY 1L/19R. For the purpose of illustration and not limitation, ownship 202 symbology is depicted as a circle in FIG. 2; those skilled in the art know that the symbology for depicting ownship 202 may be configurable by a manufacturer and/or end-user. The amount of surface information provided by the ASMM corresponds to a range ("RNG") of 2 nautical miles ("NM"), and a compass rose 204 provides the pilot with the direction of the aircraft. The compass rose 204 may also provide a scale of the range; as shown in FIG. 2, the radius of the compass rose 204 is assumed to equal 2 NM. From the information depicted in FIG. 2, ownship 202 is located on RWY 7L/25R at the intersection of perpendicular taxiway (i.e., Taxiway F as shown in FIG. 3C) and has a heading of approximately 073 degrees. One possible scenario which could explain this indication includes one in which the pilot has been cleared for take-off on RWY 7L and has begun the take-off roll. It should be noted that the runways, taxiways, ownship 202, and the compass rose 204 of FIG. 2 will be depicted in the drawings of FIG. 3 but not specifically identified, and the scale of the compass rose 204 will correspond to the range indicated in the particular drawing.

The advantages and benefits of the embodiments discussed herein may be illustrated by showing examples in the drawings of FIG. 3 of surface symbologies to improve a pilot's situational awareness while, for example, he or she is maneuvering ownship on the ground. In the embodiments of the drawings of FIG. 3, such symbologies could include, but are not limited to, a groundspeed indicator 212, wind barb 214, runway highlighter 216 and directional runway identifiers 218. The groundspeed indicator 212 symbology could depict the groundspeed of ownship when the groundspeed of ownship is lower than the minimum speed for which an airspeed indicator is "alive"; those skilled in the art know that such airspeed indicator could be a stand-alone indicator and/or an indicator depicted on a primary flight display ("PFD") unit. Groundspeed information could be depicted using data provided by the navigation system 110. For example, groundspeed could be data representative of speed 116. Alternatively, groundspeed may be determined by the change of aircraft location and/or aircraft position over a period of time.

The wind barb 214 symbology could depict wind information, where the proximal end of the barb intersects the compass rose 204. As embodied herein, data representative of wind information may be provided by the weather data source 140. As shown in the drawings of FIG. 3, the wind barb 214 symbology indicates wind direction and speed of the wind, where speed is dicated with flags beginning at the distal end of the barb. Wind direction may be indicated as blowing from the direction the flags are facing. As indicated by the wind barb 214, the wind is blowing from approximately 105 degrees at a speed of 25 knots, where the speed is indicated by the two full flags (equaling 10 knots each) and one half flag (equaling 5 knots). From the graphical depiction, the pilot may determine that ownship is encountering a wind having both a headwind component and a cross-wind component from the right. With this wind information, the pilot may take the appropriate, wind-compensating action with respect to the control surfaces of ownship.

The runway highlighter 216 could depict an assigned take-off and/or arrival runway. As embodied herein, data representative of such assigned runway could be provided by the FMS 120. As depicted with cross-hatching fill in the drawings of FIG. 3, the runway highlighter 216 may be comprised of a plurality of runway edge highlighters and/or plurality of chevrons which point in the direction of the assigned runway. Also, the sizes of the runway edge highlighters and/or the chevrons could depend on the range of the display selected by the pilot. By comparing the drawings of FIG. 3 with one another, the sizes of the runway edge highlighters and the chevrons increase when the selected range decreases.

The directional runway identifiers 218 could be employed to identify each runway. As embodied herein, data representative of such directional runway identifiers 218 could be provided by the navigation reference data source 130. As depicted in FIGS. 3B and 3C, each runway identifier may be comprised of a dosed shape containing runway identifier information. As embodied herein, the dosed shape may comprise an oval in which one of the long sides has been replaced with a pointer, where the direction of such pointer indicates the direction of the runway corresponding to the closed shape.

It should be noted that a manufacturer or end-user may apply range-based de-cluttering rules which limit the amount of information presented to the pilot. When compared with the 2 NM range of FIG. 3A, the 1 NM range of FIG. 3B includes directional runway identifiers 218. When compared with a 1 NM miles range of FIG. 3B, the 2000 FT range shown in FIG. 3C includes features such as runway markings, taxiway markings, holdlines, and taxiway labels, all of which are known to those skilled in the art. To ease the pilot's ability to distinguish between these features, each may be displayed in different colors. For example, runway markings could be displayed in white, taxiway markings and holdlines could be displayed in yellow, and taxiway labels could be dark blue while the compass rose 204 could be displayed in grey. As embodied herein, configurable de-cluttering rules may be applied to the embodiments herein and are not limited to the features depicted in the drawings of FIG. 3.

Each of the symbologies disclosed herein may be configured with enhancing effects such as, but not limited to, shading, transparency, translucency, opacity, texture-mapping, bump-mapping, fogging, shadowing, patterns, colors, or any combination thereof. For example, the runway highlighter 216 could be enhanced by color and/or intermittent flashing, where the configuration of such color and/or flashing could depend on the location of ownship in relation to the assigned runway. In another example, the directional runway identifiers 218 could be enhanced with different colors, where the color of the directional runway identifier 218 for the assigned runway is different from the other runways. In another example, the wind barbs 214 could be enhanced with different colors, where such color could depend on wind speed and/or wind direction in relation to the aircraft. In another example, the groundspeed indicator 212 could be enhanced with different colors, where such color could depend on a range of groundspeeds. Although each of the preceding examples discusses the enhancing effect of color and the possible occurrences which could trigger a different configuration of color, other enhancing effects could be employed and configured to change appearance upon the occurrence of a pre-defined event. It should be noted that the preceding examples are intended to illustrate the possible enhancing effects in which a manufacturer or end-user may configure each of the symbologies, where the generation and usage of enhancing effects are known to those skilled in the art. These examples are not intended to provide a limitation or an exhaustive list to the embodiments discussed herein.

Figure 4:
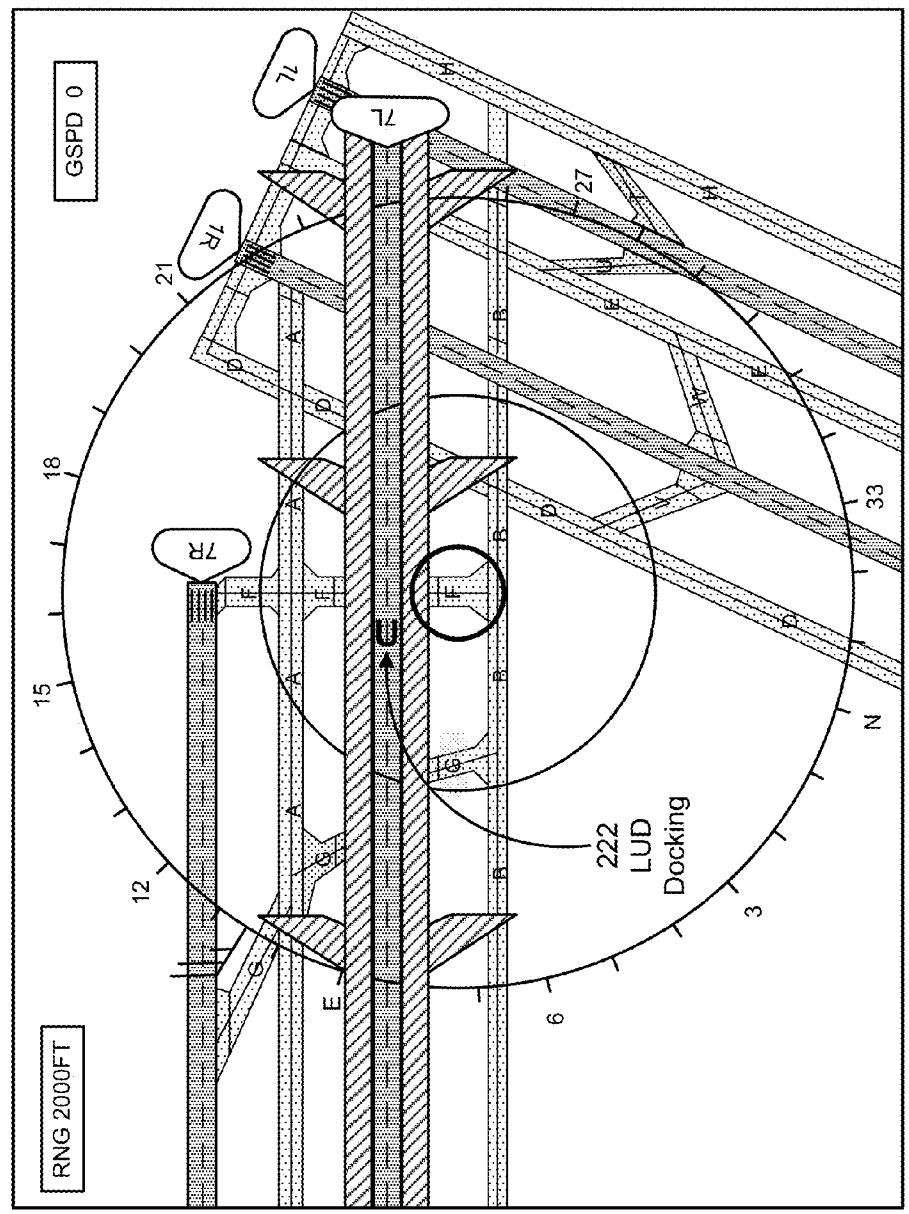
FIG. 4 depicts a second exemplary illustration of airport surface symbology depicted on an ASMM having a selected display range of 2000 feet.

In an embodiment of FIG. 4, a pilot's situational awareness while maneuvering ownship on the ground may be improved by the depiction of a line-up distance ("LUD") docking indicator 222. As embodied herein, the symbology of the LUD docking indicator 222 may be depicted as a U-shape, representing a "docking" port for the nose wheel(s) of ownship. As shown in FIG. 4, the LUD docking indicator 222 is shown along with the groundspeed indicator, wind barb, runway highlighter, and directional run identifiers disclosed in the drawings of FIG. 3.

Generally, the LUD is more prevalent in larger aircraft than smaller aircraft. The LUD may be considered as the distance required for aligning ownship with the runway centerline as ownship turns onto the runway from a taxiway as it is positioned for take-off. In one embodiment, a manufacturer or end-user could configure a default LUD. In another embodiment, a pilot may enter the LUD into the FMS 120 through a manual input device, effectively overriding any default LUD value. Once the LUD has been established, the LUD may be subtracted from the runway useable distance to determine the runway available distance.

As shown in FIG. 4, ownship is located on Taxiway F and holding short of the assigned runway RWY 7L. It is assumed that ownship is positioned for a mid-field take-off on RWY 7L; that is, the runway useable distance is less than the length of RWY 7L. The runway useable distance may be determined using runway data provided by the navigation reference data source 130 and the ownship location data provided by the navigation system 110. After the runway useable distance has been determined, the runway available distance may be compared with a computed minimum take-off field length ("TOFL"), where the computation of minimum TOFL may be performed by the FMS 120. If the runway available distance is less than the minimum TOFL, it will not be safe for ownship to take-off.

A manufacturer or end-user may take advantage of one or more enhancing effects discussed above in configuring the LUD docking indicator 222. For example, color may used to convey immediate advisory information to the crew. If the minimum TOFL exceeds the runway available distance, the LUD docking indicator 222 could be displayed in red. If the runway available distance equals or exceeds the minimum TOFL but does not exceed a margin of safety configurable by a manufacturer or end-user, the LUD docking indicator 222 could be displayed in amber or yellow. If the runway available distance exceeds the minimum TOFL and the configurable margin of safety, the LUD docking indicator 222 could be displayed in green. As embodied herein, the configurable margin of safety could be set to zero.

It should be noted that, although the disclosed embodiments have been drawn to a display unit depicting a plan view of an ASMM, they may be applied to a display unit depicting an egocentric view of airport surface(s). In one embodiment, the display unit could be configured to display an ASMM egocentrically. In another embodiment, the display unit could comprise a PFD unit providing at least "basic T" information (i.e., airspeed, attitude, altitude, and heading) against the background of an image depicting a three-dimensional perspective of the scene outside the aircraft, where the image could be generated by a synthetic vision system. As embodied herein, the PFD unit could comprise a head-down display ("HDD") unit and/or a head-up display ("HUD") unit.

Figure 5:
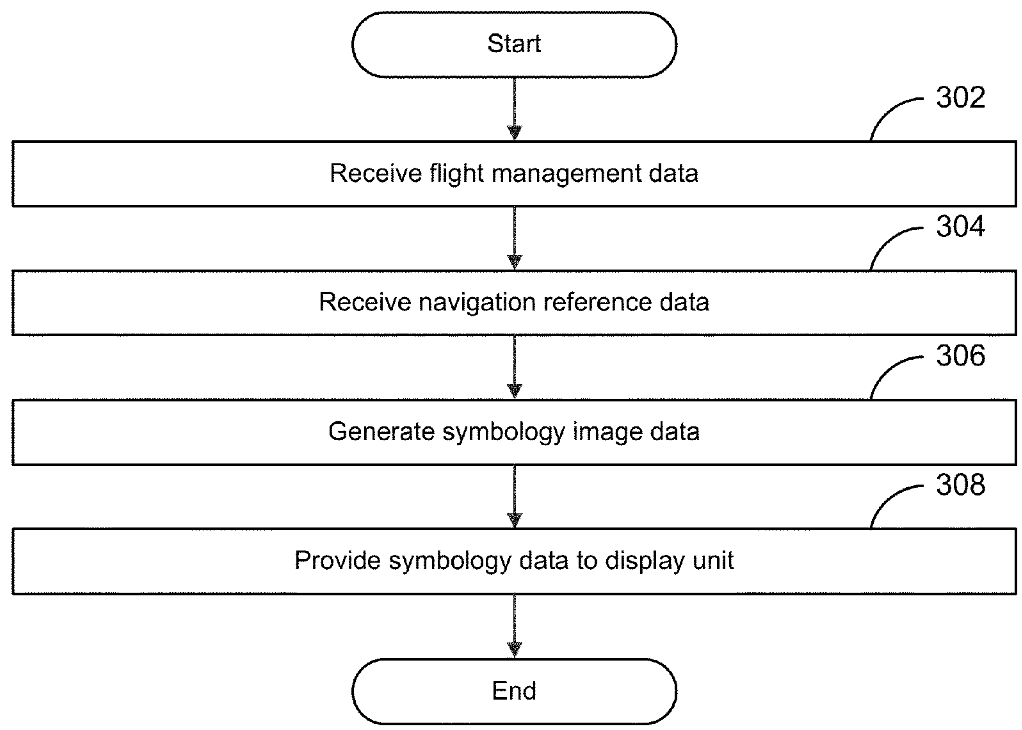
FIG. 5 depicts a flowchart of a method for presenting airport surface symbology on an aircraft display unit.

FIG. 5 depicts a flowchart 300 of an example of a method for presenting surface symbology on an aircraft display unit, where the SG 150 may be programmed or configured with instructions corresponding to the following modules. As embodied herein, the SG 150 may be a processor of an indicating system comprising one or more display units. Also, the SG 150 may be a processor of a module such as, but not limited to, a printed circuit card having one or more input interfaces to facilitate data communications with the SG 150, i.e., the receiving and providing of data. As necessary for the accomplishment of the following modules embodied in FIG. 5, the receiving of data is synonymous and/or interchangeable with the retrieval of data, and the providing of data is synonymous and/or interchangeable with the making available or supplying of data.

The method continues with module 302 with the receiving of flight management data from a source of such data such as the FMS 120, where such data could comprise data representative of assigned runway information. The method continues with module 304 with the receiving of data navigation reference data from the navigation reference data source 130, where such data could comprise data representative of one or more airport surfaces. Airport surface data could be retrieved from the navigation reference data source 130 based upon the assigned runway data, where assigned runway data corresponds to the airport at which the runway is found. As embodied herein, the source of flight management data and the source of airport surface data could be the same source; that is, the FMS 120 could provide the source data for both flight management data and airport surface data.

In an additional embodiment, navigation data representative of ownship location may be received, where such data could be provided by a source of navigation data such as the navigation system 110. As embodied herein, navigation data could be provided from the FMS 120, and ownship location data could include altitude data. Also, successive measurements of ownship location could be used to determine direction 118 to be displayed on the compass rose 204 and/or speed 116 (e.g., groundspeed) to be depicted on an indicator (e.g., groundspeed indicator); alternatively, direction 118 and speed 116 could be provided as separate inputs. If received, data representative of one or more airport surfaces could be retrieved from the navigation reference data source 130 based upon ownship location data. If ownship location data is provided, an airport surface map could move when the location of ownship moves.

In an additional embodiment, data representative of weather information data may be received, where such data could be provided by the weather data source 140. As embodied herein, the weather data could be based upon the airport of the assigned runway data and/or airport corresponding to the ownship location.

The method continues with module 306 with the generating of a symbology image data based upon the assigned runway data and airport surface data. As embodied herein, the SG 150 may generate symbology image data representative of an image depicting one or more airport surface symbologies based upon the data received. In one embodiment, the depicted image could include a runway highlighter around the assigned runway as disclosed above. In another embodiment, one or more directional runway identifiers as disclosed above could be included in the depiction of the image.

In an additional embodiment, navigation data could be included as a basis for generating the symbology image data. If so, additional depiction(s) could be included in the image. For example, the image could include the depiction of ownship location when the navigation data is representative of ownship location. In another example, the image could include the depiction of the groundspeed indicator, where groundspeed could be determined using ownship location data. In another example, the image could include the depiction of the LUD docking indicator using ownship location data and assigned runway data. If ownship location data is provided, the image may be depicted egocentrically.

In an additional embodiment, weather data could be included as a basis for generating the symbology image data. If so, at least one additional depiction could be included in the image. For example, the image could include the depiction of a wind barb corresponding to the wind information provided in the weather data and direction of the aircraft.

The method continues with module 308 with the providing of the symbology image data to one or more display units. When received by the display unit, the image represented in the symbology image data may be presented to the pilot on the screen of the display unit. In one embodiment, one or more symbologies depicted in the image may be presented in a plan view of an ASMM and/or an airport surface (non-moving) map, where the type of map could depend on the use of ownship location data. In another embodiment, one or more symbologies may be presented egocentrically as an ASMM. In another embodiment, one or more symbologies may be presented egocentrically on the screen of a PFD comprising an HDD unit and/or an HUD unit. Then the flowchart proceeds to the end.

It should be noted that the method steps described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for presenting surface symbology on an aircraft display unit, said system comprising:

a source of flight management data;

a source of navigation reference data;

a symbology generator configured to receive the flight management data representative of assigned runway information, receive the navigation reference data representative of at least one airport surface, generate symbology image data based upon the flight management data and the navigation reference data, where the symbology image data is representative of an image depicting a runway highlighter of the assigned runway, where the runway highlighter is comprised of a plurality of runway edge highlighters highlighting runway edges, and a plurality of divided chevrons pointing in the direction of the assigned runway, and provide the symbology image data to a display unit; and the display unit configured to receive the symbology image data, and present the image represented in the symbology image data on the screen of the display unit.

2. The system of claim 1, wherein a flight management system is the source of flight management data and the source of the navigation reference data.

3. The system of claim 1, wherein the image includes a depiction of at least one directional runway identifier, where each directional runway identifier is comprised of a closed shape containing runway identifier information, and the closed shape is an oval on which one of the long sides of the oval is replaced with the tip of a pointer.

4. The system of claim 1, further comprising:

a source of navigation data, where the symbology generator is further configured to receive the navigation data, such that the basis for generating the symbology image data includes the navigation data.

5. The system of claim 4, wherein a flight management system is the source of navigation data.

6. The system of claim 4, wherein the image includes a depiction of ownship location.

7. The system of claim 4, wherein the image includes a depiction of a line-up distance docking indicator.

8. The system of claim 4, wherein the image includes a depiction of a groundspeed indicator.

9. The system of claim 4, wherein the image is depicted egocentrically.

10. The system of claim 4, further comprising:

a source of weather data, where the symbology generator is further configured to receive the weather data, such that the basis for generating the symbology image data includes the weather data, and the image includes a depiction of a wind barb.

11. A module for presenting surface symbology on an aircraft display unit, said module comprising:

an input communications interface configured to receive data from at least one data source; and a symbology generator configured to receive flight management data representative of assigned runway information, receive navigation reference data representative of at least one airport surface, generate symbology image data based upon the flight management data and the navigation reference data, where the symbology image data is representative of an image depicting a runway highlighter of the assigned runway, where the runway highlighter is comprised of a plurality of runway edge highlighters highlighting runway edges, and a plurality of divided chevrons pointing in the direction of the assigned runway, and provide the symbology image data to an output communications interface configured to provide the symbology image data to a display unit, whereby the image represented in the symbology image data is presented on the screen of the display unit; and the output communications interface.

12. The module of claim 11, wherein the image includes a depiction of at least one directional runway identifier, where each directional runway identifier is comprised of a closed shape containing runway identifier information, and the closed shape is an oval on which one of the long sides of the oval is replaced with the tip of a pointer.

13. The module of claim 11, wherein the symbology generator is further configured to receive the navigation data, such that the basis for generating the symbology image data includes the navigation data.

14. The module of claim 13, wherein the image includes a depiction of ownship location.

15. The module of claim 13, wherein the image includes a depiction of a line-up distance docking indicator.

16. The module of claim 13, wherein the image includes a depiction of a groundspeed indicator.

17. The module of claim 13, wherein the image is depicted egocentrically.

18. The module of claim 13, wherein the symbology generator is further configured to receive the weather data, such that the basis for generating the symbology image data includes the weather data, and the image includes a depiction of a wind barb.

19. A method for presenting surface symbology on an aircraft display unit, said method comprising:

receiving flight management data representative of assigned runway information;

receiving navigation reference data representative of at least one airport surface;

generating symbology image data based upon the flight management data and the navigation reference data, where the symbology image data is representative of an image depicting a runway highlighter of the assigned runway, where the runway highlighter is comprised of a plurality of runway edge highlighters highlighting runway edges, and a plurality of divided chevrons pointing in the direction of the assigned runway; and providing the symbology image data to a display unit, whereby the image represented in the symbology image data is presented on the screen of the display unit.

20. The method of claim 19, wherein the image includes a depiction of at least one directional runway identifier, where each directional runway identifier is comprised of a closed shape containing runway identifier information, and the closed shape is an oval on which one of the long sides of the oval is replaced with the tip of a pointer.

21. The method of claim 19, further comprising:

receiving navigation data, such that the basis for generating the symbology image data includes the navigation data.

22. The method of claim 21, wherein the image includes a depiction of ownship location.

23. The method of claim 21, wherein the image includes a depiction of a line-up distance docking indicator.

24. The method of claim 21, wherein the image includes a depiction of a groundspeed indicator.

25. The method of claim 21, wherein the image is depicted egocentrically.

26. The method of claim 21, further comprising: receiving weather data, such that the basis for generating the symbology image data includes the weather data, and the image includes a depiction of a wind barb.

* * * * *